United States Patent
Gallo et al.

(10) Patent No.: US 8,950,427 B2
(45) Date of Patent: Feb. 10, 2015

(54) WATER TRANSPORT SYSTEM

(76) Inventors: Eugene F. Gallo, Livingston, TX (US); Amy-Noelle Gallo, Livingston, TX (US)

( * ) Notice: Subject to any disclaimer, the term of this patent is extended or adjusted under 35 U.S.C. 154(b) by 775 days.

(21) Appl. No.: 13/180,126

(22) Filed: Jul. 11, 2011

(65) Prior Publication Data
US 2012/0012196 A1  Jan. 19, 2012

Related U.S. Application Data

(60) Provisional application No. 61/364,250, filed on Jul. 14, 2010.

(51) Int. Cl.
| | |
|---|---|
| *B60P 3/24* | (2006.01) |
| *B60R 9/06* | (2006.01) |
| *B60R 15/00* | (2006.01) |
| *B67D 7/02* | (2010.01) |
| *B67D 7/62* | (2010.01) |
| *B67D 7/78* | (2010.01) |
| *F16K 21/18* | (2006.01) |
| *F16K 31/18* | (2006.01) |

(52) U.S. Cl.
CPC .................................. *B60R 15/00* (2013.01)
USPC ........... 137/351; 137/259; 137/391; 137/398; 137/565.37; 141/198; 224/404; 224/545; 280/831

(58) Field of Classification Search
USPC ............ 137/343, 899, 351, 565.37, 391, 395, 137/267, 259, 397, 398; 220/23.83, 23.86; 206/503, 504, 505, 507, 509; 224/400, 224/401, 402, 403, 404, 545, 546, 547, 224/555; 280/830, 831, 833; 141/198, 199, 141/230; 403/364; 4/663–665
See application file for complete search history.

(56) References Cited

U.S. PATENT DOCUMENTS

| | | | | |
|---|---|---|---|---|
| 2,474,094 | A * | 6/1949 | Colquitt | 280/831 |
| 2,862,631 | A * | 12/1958 | Gamble | 410/42 |
| 3,854,621 | A * | 12/1974 | Parry | 220/554 |
| 4,580,827 | A * | 4/1986 | Feagan | 296/37.6 |
| 4,796,914 | A * | 1/1989 | Raynor | 280/757 |
| 5,513,894 | A | 5/1996 | Ragsdale | |
| 6,029,707 | A | 2/2000 | Couch | |
| 6,039,203 | A * | 3/2000 | McDaniel | 220/562 |
| 6,148,863 | A * | 11/2000 | Memory et al. | 137/899 |
| 6,352,088 | B1 * | 3/2002 | Stegall | 141/1 |
| 7,093,856 | B2 * | 8/2006 | Spenceley et al. | 280/838 |
| 7,192,060 | B2 * | 3/2007 | Warrick | 280/831 |
| 7,631,659 | B2 * | 12/2009 | Schneider et al. | 137/571 |
| 2005/0045228 | A1 * | 3/2005 | Labrador | 137/357 |
| 2008/0087335 | A1 * | 4/2008 | Louwagie et al. | 137/557 |

* cited by examiner

*Primary Examiner* — Craig Schneider
*Assistant Examiner* — Jonathan Waddy
(74) *Attorney, Agent, or Firm* — Hovey Williams LLP

(57) ABSTRACT

A water transport system comprising a first container, a second container, a mechanical connector fixing the first and second containers to each other and/or a towing vehicle, and a control device. The water transport system may be used in a method of water management for recreational vehicles (RV), trailers, or motor homes. The water transport system may be sized and configured to fit in a bed of the towing vehicle used for towing the RV, trailer, or motor home. The second container may be coupled to a macerator pump of the RV, trailer, or motor home to receive wastewater therefrom and the control device may be configured to automatically shut off the macerator pump when the second container is full.

15 Claims, 6 Drawing Sheets

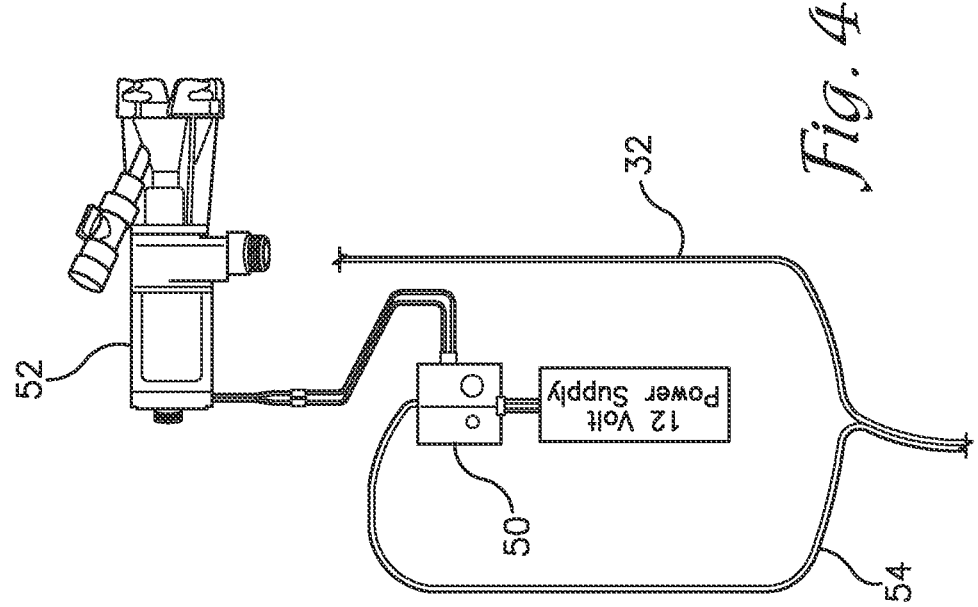
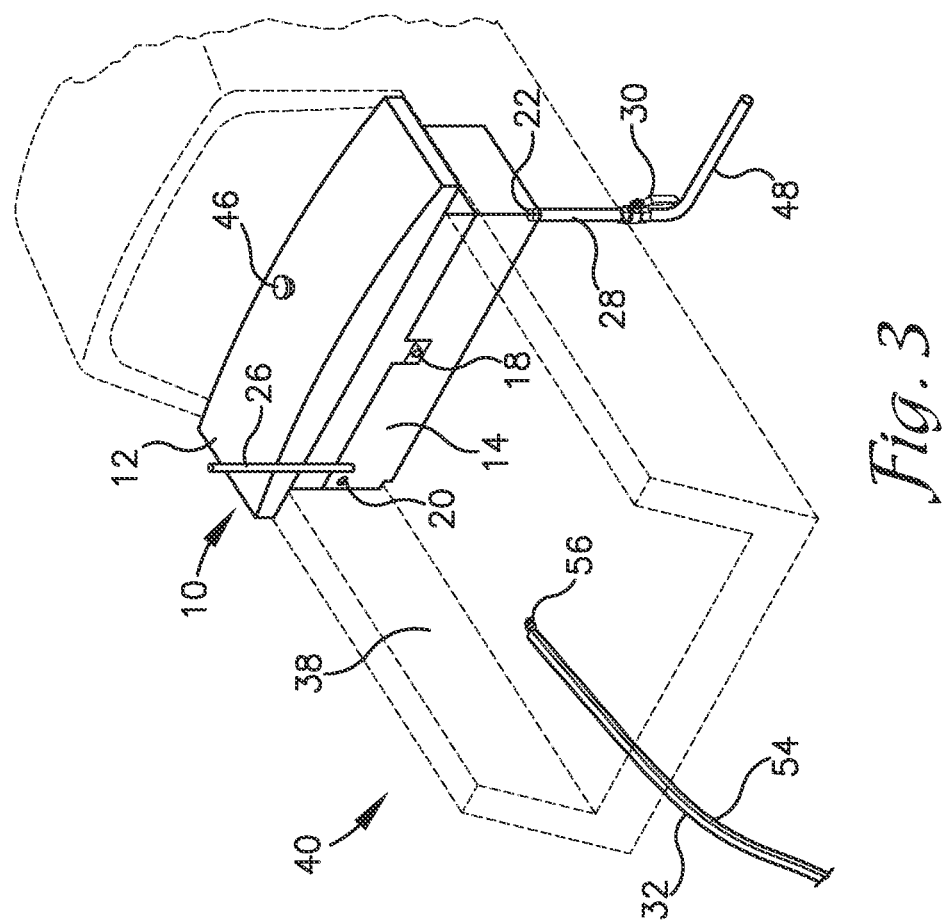

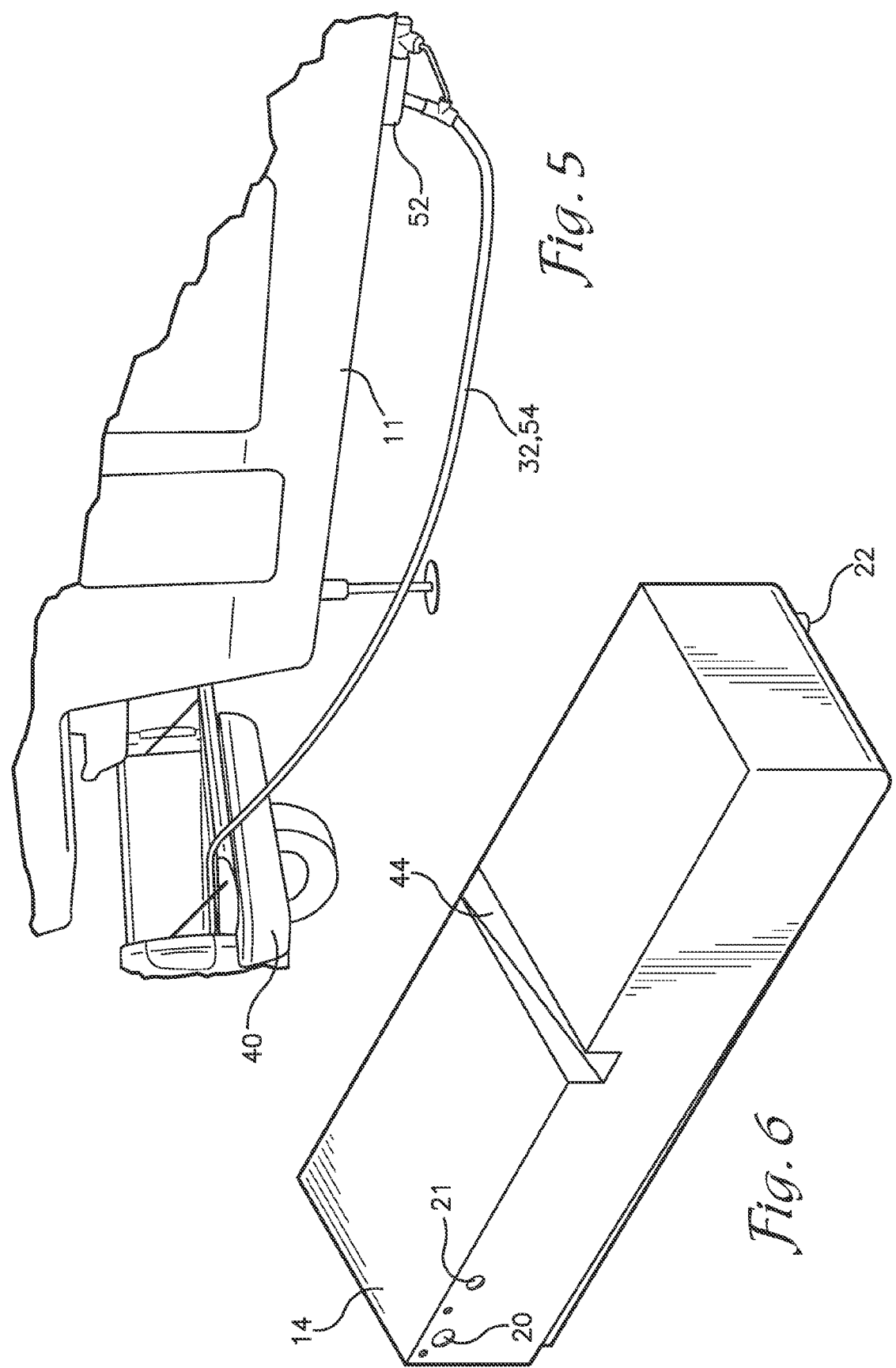

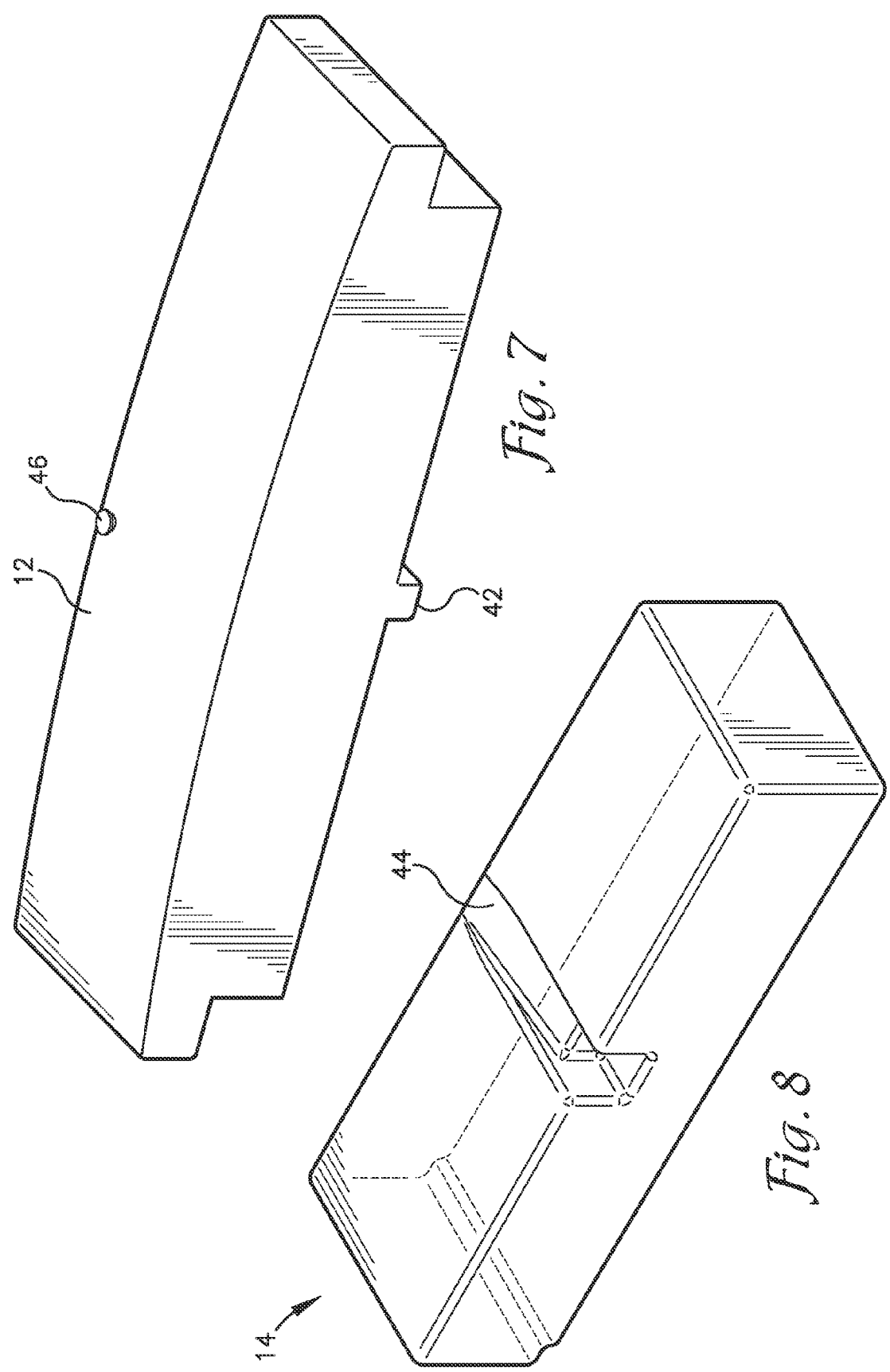

WATER TRANSPORT SYSTEM

RELATED APPLICATIONS

This non-provisional patent application claims priority benefit to earlier-filed U.S. provisional patent application titled "RV PORTABLE FRESH WATER AND WASTE WATER TRANSPORT SYSTEM" Ser. No. 61/364,250, filed Jul. 14, 2010, hereby incorporated in its entirety by reference into the present application

BACKGROUND

Embodiments of the present invention relate to a water transport system for installation in a truck bed.

Many recreational vehicles (RV), motor homes, and trailers include pipes and various other plumbing features for use with sinks, toilets, and/or showers installed therein. The sinks, toilets, and/or showers may be fed by a freshwater holding tank in the RV and may drain into an appropriate grey and/or black water holding tank in the RV for subsequent disposal. When the freshwater holding tank of the RV is empty, it must be refilled by an outside freshwater source. Likewise, when the grey or black water holding tank is full, it must be emptied in an approved drain or at a designated dumping area. However, when camping in a remote location, freshwater sources and approved drains may not be readily available.

Therefore, portable holding tanks are sometimes used to empty the wastewater or refill the freshwater without having to transport the entire RV, trailer, or motor home from its remote camping location. However, these portable holding tanks traditionally only hold a maximum of 42 gallons of waste water, necessitating several tanks or several trips to fill an RV freshwater tank or to empty a wastewater tank. Additionally, to transport the portable holding tanks to a water source or designated dumping area, they must be loaded into another vehicle, such as a pick-up truck. Lifting such tanks is very difficult when they are full, and driving on unpaved or unleveled ground can cause some of the waste water to spill out of the portable holding tanks. The portable holding tanks are also prone to leakage because of rough handling, leaving waste in the pick-up truck and on the road. Additionally, waste water may remain trapped in portable holing tanks even when they are emptied and may contact users while handling the tanks.

Accordingly, there is a need for a water transport system that overcomes the limitations of the prior art.

SUMMARY

The present invention includes a water transport system especially designed for use with recreational vehicles (RV), trailers, or motor homes. The water transport system may be sized and configured to fit in a bed of a towing vehicle configured for towing the RV, trailer, or motor home. The water transport system may comprise a first container having an outlet hole and/or an inlet hole formed therethrough, a second container having an outlet hole and/or an inlet hole formed therethrough, and at least one connector detachably connecting the first container to and above the second container.

In some embodiments of the invention, at least a portion of the first container may have a length or width that is slightly wider than the bed of the towing vehicle and the second container may be shaped and configured to fit into the bed of the towing vehicle. Freshwater may be pumped or gravity fed from the first container to the RV, trailer, or motor home. The second container may be fluidly coupled with a macerator pump of the RV, trailer, or motor home to receive wastewater therefrom. Furthermore, the water transport system may comprise a control device configured to automatically shut off the macerator pump when the second container is full.

Another embodiment of the present invention may include a water transport system comprising a first container having inlet and outlet holes, a second container having inlet and outlet holes, and a valve associated with an inlet hole of the second container. The second container may be configured to be secured to the bed of the towing vehicle and at least one connector may detachably connect the first container to and above the second container. The valve may be configured to automatically close and/or otherwise indicate when the second container is full. The water transport system may further comprise a hose coupled to the valve and configured to fluidly couple the valve with a macerator pump of an RV, trailer, or motor home, as well as a control device configured to automatically shut off the macerator pump when the valve is closed or otherwise indicates that the second container is full.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 3 is a perspective view of another embodiment of the water transport system of FIG. 1 with an inlet/outlet hole thereof located in an alternative location;

FIG. 4 is a schematic drawing of a control system of the water transport system of FIG. 1;

FIG. 5 is a perspective view of a hose of the water transport system extending to a trailer macerator pump;

FIG. 6 is a perspective view of a second container of the water transport system of FIG. 1 configured for holding wastewater;

FIG. 7 is a perspective view of a first container of the water transport system of FIG. 1 configured for holding freshwater;

FIG. 8 is a perspective view of an alternative embodiment of the second container of the water transport system of FIG. 1.

Figure 1:
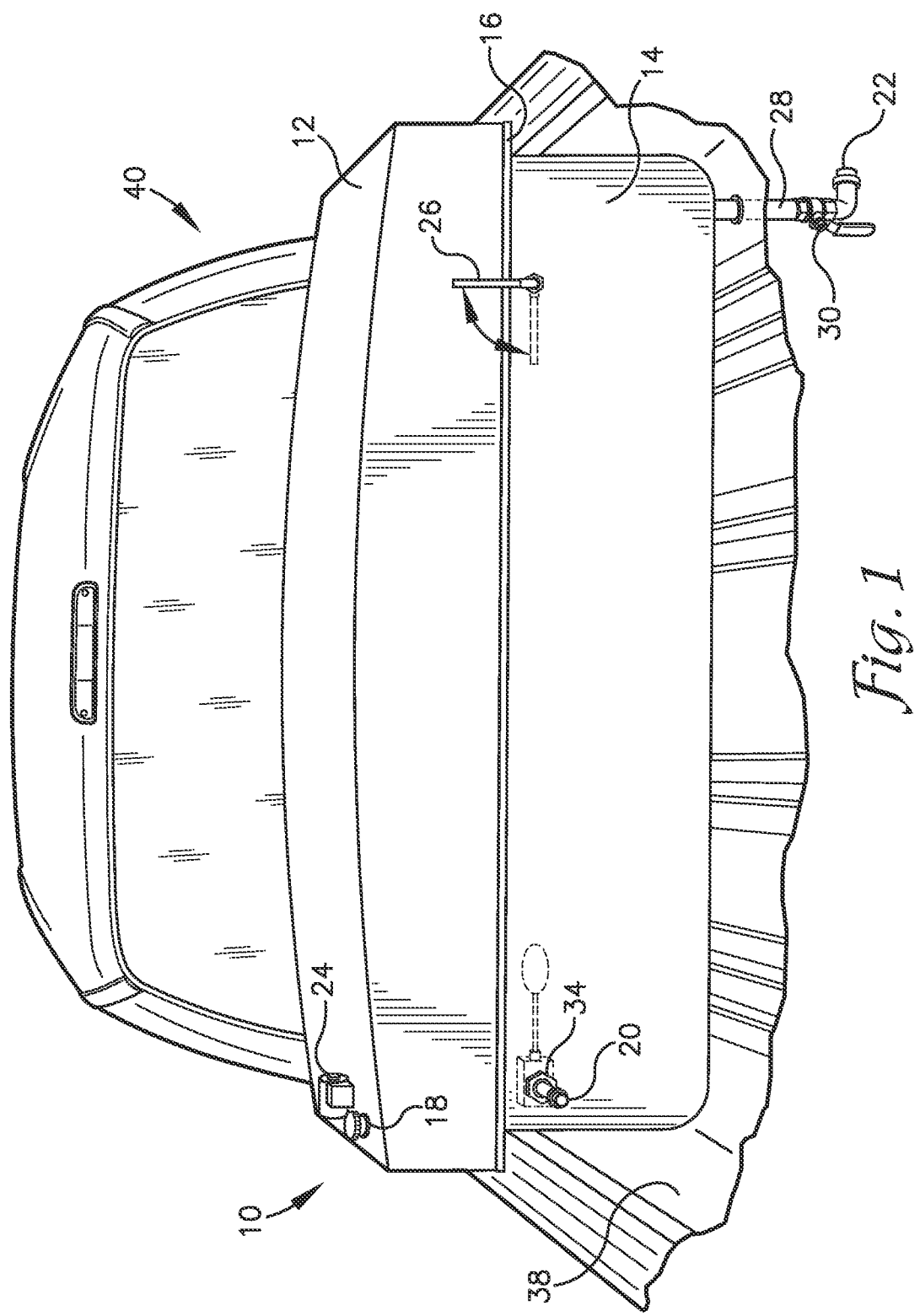
FIG. 1 is a rear perspective view of a water transport system constructed in accordance with an embodiment of the invention.

The drawing figures do not limit the present invention to the specific embodiment disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention, as illustrated in FIGS. 1-8, is a water transport system 10 used in cooperation with a plumbing system of a recreational vehicle RV, trailer, or motor home 11, as illustrated in FIG. 5. The water transport system 10 may comprise a first container 12, a second container 14, and one or more mechanical connectors 16 configured to connect the first container 12 with the second container 14 and/or to fix the containers 12,14 to a towing vehicle, as later described herein. Each of the containers 12,14 may comprise or have formed therein one or more inlet and/or outlet holes 18,20,22. Furthermore, the water transport system may comprise a pump 24, a vent pipe 26, a drain pipe 28, a discharge valve 30 attached to the drain pipe 28 and connectable to a discharge hose 48, at least one connection hose 32, and at least one additional valve 34 configured for controlling flow into and/or out of one or more of the containers 12,14. In some embodiments of the invention, the water transport system 10 may also comprise a control device 50 configured to automatically shut off a macerator pump 52 (as illustrated in FIGS. 4 and 5) when one of the containers 12,14 is full. The macerator pump 52, as later described herein, may be a component of the RV, trailer, or motor home 11 communicably coupled to the water transport system 10 and/or may be a component of the water transport system 10.

Figure 2:
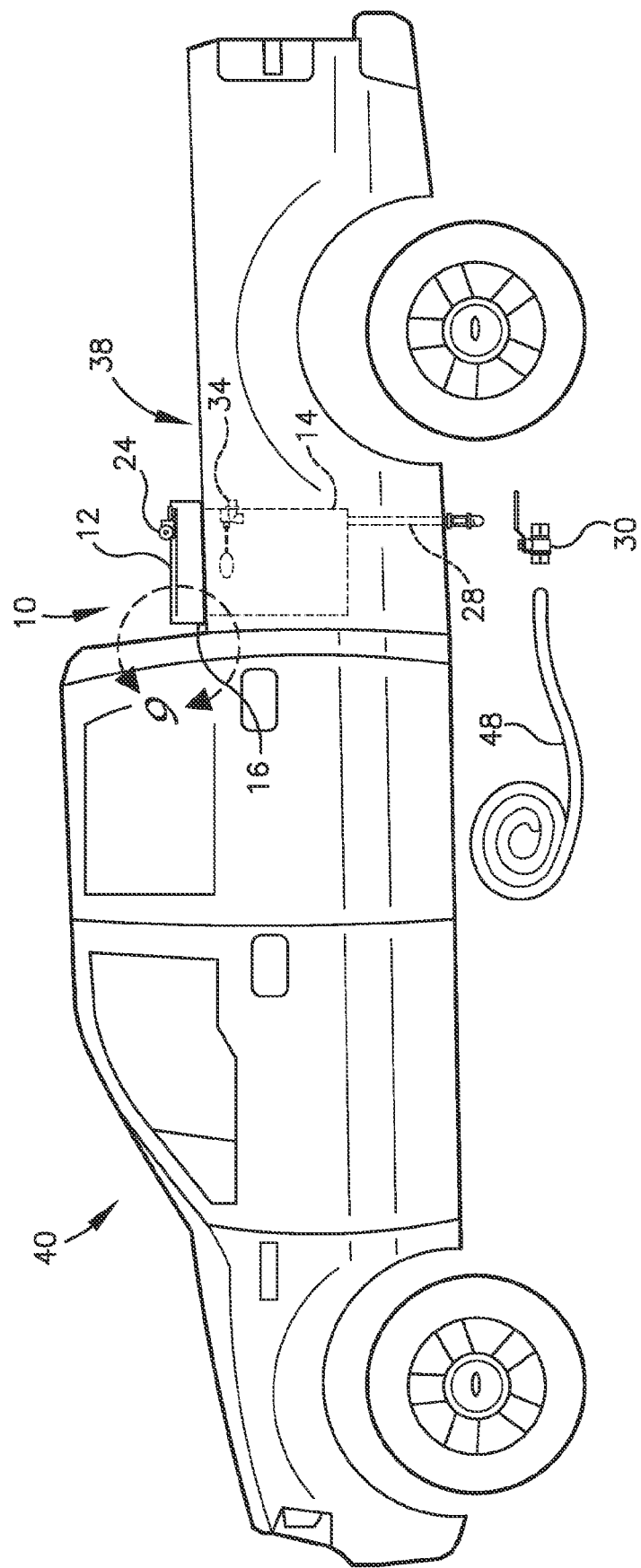
FIG. 2 is a side view of a towing vehicle with the water transport system of FIG. 1 installed therein.

The containers 12,14 may be made of any substantially rigid materials, such as plastic, metal, or composite materials. Each of the containers 12,14 may hold approximately 70 gallons of liquid, although the containers may be of any volume without departing from the scope of the invention. The first container 12 may be configured, for example, to contain fresh water, and the second container 14 may be configured to contain waste water, such as black and/or grey water from a toilet or sink drain. In some embodiments of the invention, the second container 14 may be sized and configured to fit into a bed 38 of a towing vehicle 40, such as a pick-up truck, as illustrated in FIGS. 1-3.

The first container 12 may rest substantially above the second container 14 when the second container 14 is positioned in or installed in the towing vehicle 40. At least a portion of the first container 12 may be sized slightly wider than a width of the towing vehicle's bed 38 such that it rests on or above side walls of the bed 38. This may allow at least a portion of the weight of the first container 12 to be supported by the side walls of the bed 38, so that not all of the weight is placed on the second container 14 and/or a floor of the towing vehicle's bed 38. In some embodiments of the invention, a lower portion of the first container 12 may rest between side walls of the towing vehicle bed 38 and an upper portion of the first container 12 may be slightly wider than the distance between the walls and configured to rest thereon. The first and second containers 12,14 may be mechanically connected with each other and may be disconnected as desired for a given application. However, in some alternative embodiments of the invention, the first and second containers 12,14 may be formed integral with each other.

The first and second containers 12,14 may have any dimensions required for a given towing vehicle and a desired amount of freshwater or wastewater to be stored therein. In an example embodiment of the invention, the first container 12 may have a total width of approximately 74 inches for its top portion and a width of approximately 64 inches for its bottom portion. Ledges of the top portion of the first container 12 may be approximately 5 inches in width and may be configured to rest on top of sidewalls of the towing vehicle's bed 38. The top portion of the first container 12 may have a height varying between approximately 4 inches and 7 inches, due to a rounded top wall thereof, and the bottom portion of the first container 12 may have a height of approximately 6 inches. The first container 12 may also have a depth of approximately 21 inches.

In an example embodiment of the invention, the second container 14 may have a width of approximately 64 inches, a depth of approximately 21 inches, and a varying height of approximately 11.5 or 12.5 inches at a first side and approximately 13.5 inches at a second side thereof. Specifically, the first and/or second containers 12,14 may be formed with a bottom wall that is substantially sloped, thereby aiding in draining thereof. For example, the second container's bottom wall may comprise an approximately 1-inch grade sloping from left to right or right to left, depending on the location of the drain pipe 28, resulting in a varying height of the second container 14 throughout its width.

As illustrated in FIG. 7, the first container 12 may be shaped and configured to substantially mate with or interdigitate with a portion of the second tank 14, as illustrated in FIGS. 6-8. For example, the first container 12 may have a protrusion 42 or protruded portion extending downward toward the second container 14 and the second container 14 may have an indention 44 formed into its top outer wall which substantially matches the size and shape of at least a portion of the protrusion 42 of the first container 12, such that when the protrusion 42 rests within the indention 44, horizontal movement between the first and second containers 12,14 may be limited. In some embodiments of the invention, the first and/or second containers 12,14 may also have one or more inserts integrally formed therewith and configured to allow mechanical connection of the containers 12,14 with each other or with the towing vehicle 40.

The inlet and outlet holes 18-22 formed into the containers 12,14 may include an inlet/outlet hole 18 for the first container 12, an inlet hole 20 for the second container 14, and an outlet hole 22 for the second container 14, which may be obstructed by the discharge valve 30, as later described herein. The inlet and outlet holes described herein may be formed at any location of the containers 12,14 without departing from the scope of the invention. For example, FIG. 1 illustrates the inlet/outlet hole 18 located through a top surface of the first container 12, while FIG. 3 illustrates the inlet/outlet hole 18 located through a nested wall of the protrusion 42 of the first container 12. The inlet and outlet holes 18-22 may comprise or be coupled with a nozzle, hose, valve, or any mechanism configured for inputting or outputting fluids therethrough. In some embodiments of the invention, the inlet hole 20 for the second container 14 may be a PVC pressure inlet hole for waste water. Furthermore, in some embodiments of the invention, the outlet hole 22 for the second container 14 may be approximately 3 inches in diameter. However, the inlet and outlet holes 18-22 may be of any size and configuration without departing from the scope of the invention. In some embodiments of the invention, as illustrated in FIGS. 3 and 7, the first container 12 may also have a vent 46 or vent hole formed therein to allow air to enter and escape.

Figure 9:
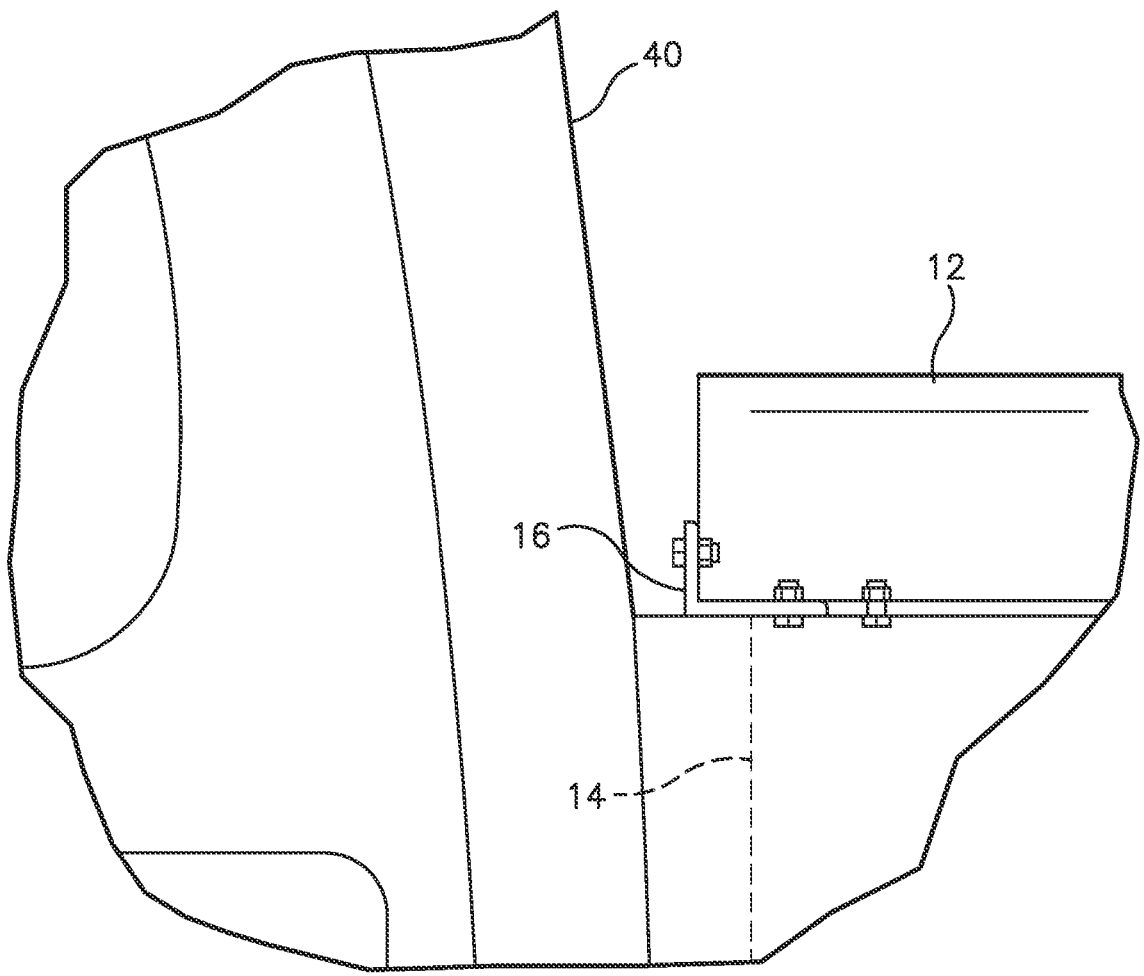
FIG. 9 is a side view of mechanical connectors of the water transport system of FIG. 1, illustrating the mechanical connectors attaching the first and second containers to each other and to the towing vehicle.

The mechanical connectors 16 may be any components configured to connect the first container 12 to the second container 14 and/or to connect either of the containers 12,14 to the towing vehicle 40. For example, the mechanical connectors 16 may include a spacer, such as a flat bracket with holes therethrough configured to hold the first and second containers 12,14 together, as illustrated in FIGS. 1 and 2, and to provide space between the containers 12,14. The mechanical connectors 16 may also include an L-shaped bracket attached to the second container 14 and configured to be fixed to the towing vehicle 40, as illustrated in FIG. 9. Therefore, in some embodiments of the invention, the mechanical connectors 16 may comprise brackets configured to mount the second container 14 to the towing vehicle's bed 38, and the first container 12 may be attached directly to the second container 14. Various methods of securing the first and second containers 12,14 to the towing vehicle 40 may be used without departing from the scope of the invention.

The pump 24 may be any water or fluid pump and may fluidly communicate with one of the containers 12,14. For example, the pump 24 may be configured to pump freshwater out of the first container 12. The pump 24 may be used to provide freshwater from the first container 12, through the inlet/outlet hole 18, to the RV, trailer, or motor home 11. In some embodiments of the invention, the pump 24 may receive power via an internal battery or a power source communicably coupled with the control system 50. In an alternative embodiment of the invention, freshwater may be fed out of the first container 12 by way of gravity and the pump 24 may be omitted or replaced with a shut-off valve. In some embodiments of the invention, the first container 12 may be filled with a freshwater garden hose and simple water pressure may force the freshwater out to the RV, trailer, or motor home 11.

The vent pipe 26, as illustrated in FIGS. 1 and 3, may be attached to or integral with at least one of the containers 12,14 and may extend outward from an opening thereof or otherwise extend through a wall of one of the containers 12,14. For example, as illustrated in FIG. 6, the vent pipe 26 may extend outward from an opening 21 in the second container 14 to vent waste water held therein. In some embodiments of the invention, the vent pipe 26 may be a swivel vent pipe configured to pivot, such that an open end thereof may be actuated (manually or automatically) to face any direction desired by an operator of the towing vehicle 40. In some embodiments of the invention, the vent pipe 26 may comprise or be communicably coupled with a valve (not shown), such as a ball valve, at a base thereof. This valve may be configured to protect the vent pipe 26 from overflowing.

The drain pipe 28, illustrated in FIGS. 1-3, may be attached to or integral with at least one of the containers 12,14 and may extend from an opening thereof, such as the outlet hole 22. Alternatively, the drain pipe 28 may be integrally formed with one of the containers 12,14 and outlet hole 22 may be located at a distal end of the drain pipe 28. The drain pipe 28 may extend in a substantially downward direction when the second container 14 is installed in the towing vehicle 40. The drain pipe 28 may be used to empty waste water from the second container 14. In some embodiments of the invention, as illustrated in FIGS. 2 and 3, the drain pipe 28 may include or be coupled with the discharge hose 48 via connection to the discharge valve 30 and may be used to discharge wastewater into a designated waste pipe (not shown). To install the water transport system 10 into the towing vehicle 40, a hole may be cut or otherwise formed through the bed 38 thereof so that the drain pipe 28 may extend therethrough. This allows the second container 14 to be emptied without being removed from the towing vehicle 40.

The discharge valve 30 may be coupled with the drain pipe 28 and may be actuated between an open and closed position. For example, the discharge valve 30 may comprise a trap door configured to be actuated or forced open by an operator to dump waste water from the second container 14, via the outlet hole 22, drain pipe 28, and discharge hose 48 at designated waste dumping stations. In some embodiments of the invention, the discharge valve 30 may be a ball valve, a BLADEX waste valve, or any other suitable valve configured to open and close manually or via automated controls. For example, the type of discharge valve used may depend on the diameter chosen for the drain pipe 28.

The connection hose 32, as illustrated in FIGS. 3-5, may be any hose or conduit configured for fresh water, waste water, or other liquids to flow to and/or from at least one of the containers 12,14. In some embodiments of the invention, as illustrated in FIG. 5, the connection hose 32 may be connected to the outlet or inlet holes 20,22 of the second container 14 and may transport wastewater from the RV, trailer, or motor home to the second container 14. For example, the connection hose 32 may be configured to be fluidly coupled with the macerator pump 52. Note that although only one connection hose 32 is illustrated in FIGS. 2-5, the invention may actually comprise two connection hoses—one for supplying freshwater from the first container 12 to the RV, trailer, or motor home 11, and one for feeding wastewater from the macerator pump 52 to the second container 14. In some embodiments of the invention, the connection hose 32 may be approximately 0.75 inches in diameter and approximately 25 feet long. However, any hose length or diameter may be used without departing from the scope of the invention.

The valve 34 may be associated with the inlet 20 of the second container 14. In some embodiments of the invention, the valve 34 may be a ball float valve, a float switch, or another operational equivalent configured to shut when the second container 14 is full. The diameter of the valve 34 may be approximately 1.5 inches, however the valve 34 may have any diameter without departing from the scope of the invention.

The valve 34 may also be configured to indicate to the control device 50 when the second container is full. For example, the control device 50 may comprise a relay that automatically shuts off the macerator pump 52 to prevent it from pumping any more wastewater to the second container 14 when the valve 34 indicates that the second container 14 is full. In other words, the control device 50 may shut off power to the macerator pump 52. In an alternative embodiment of the invention, the control device 50 may also be configured to shut off power to the pump 24 when the valve 34 indicates that the second container 14 is full. This could prevent fresh water from being fed to the RV, trailer, or motor home 11 (which would need to be drained somewhere) when the second container 14 holding the wastewater is full.

As described above and illustrated in FIGS. 4-5, the control device 50 may comprise one or more relays for automatically shutting off the pump 24 when the valve 34 indicates that the second container 14 is full, and may also comprise a power supply. The power supply may be, for example, a 12 volt power source configured to supply power to the macerator pump 52 and/or the pump 24. The control device 50 may include any electrical and/or mechanical components for providing automation of various valves and pumps of the water transport system 10. Furthermore, in some embodiments of the invention, the control device 50 may be communicably coupled with one or more sensors (not shown) configured for indicating additional information about the water transport system 10. The control device 50 may also be configured to actuate any of the valves 30,34 or the pumps 24 described herein.

In some embodiments of the invention, the control device 50 may specifically comprise or be communicably coupled with an electrical cable 54, as illustrated in FIGS. 3-5, which may connect the valve 34 and/or the pump 24 with the control device 50. The electrical cable 54 may be physically connected with the connection hose 32, so that a single cable/hose may extend from the RV, trailer, or motor home 11 to the water transport system 10. The electrical cable 54 may also serve as a communication link between the valve 34, or any sensor used to indicate that the second container 14 is full, and the control device 50. Furthermore, the electrical cable 54 may be electrically coupled with the macerator pump 52 such that the control device 50 may shut off power to the macerator pump 52 or turn power to the pump 24 back on. The electrical cable 54 may also comprise one or more cable connector plugs 56 configured to connect the electrical cable 54 to the valve 34 and/or the macerator pump 52, as illustrated in FIG. 3.

The water transport system 10 may be used in a method of fresh water and waste water management. The method may comprise, for example, the step of mechanically fixing the first and/or second containers 12,14 to the towing vehicle 40 with one or more of the mechanical connectors 16 and connecting the connection hose 32 from the second container 14 to the RV, trailer, or motor home 11. An additional hose may be connected from the first container 12 (at the pump 24) to the RV, trailer, or motor home 11 to provide freshwater thereto.

The method may also comprise the steps of pumping fresh water with the pump 24 from the first container 12 to the RV, trailer, or motor home 11, receiving waste water from the RV, trailer, or motor home 11 in the second container 14, and automatically shutting off the macerator pump 52 when the valve 34 or any other sensor indicates that the second container 14 is full. Additionally or alternatively, the method may comprise the step of automatically shutting off the pump 24 when the valve 34 or any other sensor indicates that the second container 14 is full. In some embodiments of the invention, the method of fresh and waste water management may further comprise the steps of disconnecting the connection hose 32 extending between the RV, trailer, or motor home and the first or second container 12,14, driving the towing vehicle 40 to a location for dumping waste water, and emptying waste water from the second container 14 by opening the discharge valve 30 of the drain pipe 28.

Although the invention has been described with reference to the embodiments illustrated in the attached drawing figures, it is noted that equivalents may be employed and substitutions made herein without departing from the scope of the invention as recited in the claims.

Having thus describe various embodiments of the invention, what is claimed as new and desired to be protected by Letters Patent includes the following:

1. A water transport system comprising:
   a first container having at least one of an outlet hole and an inlet hole formed therethrough, wherein at least a portion of the first container has a length or width that is greater than a width of a bed of a towing vehicle;
   a second container having a bottom wall, a vent opening, an outlet hole, and an inlet hole formed therethrough, wherein the second container is shaped and configured to fit into the bed of the towing vehicle;
   a drain pipe extending from the outlet hole of the second container, wherein the bottom wall of the second container is substantially sloped in a direction toward the drain pipe;
   a vent pipe configured for venting the second container, wherein the vent pipe is pivotally attached to the second container and fluidly coupled with the vent opening; and
   at least one connector detachably connecting the first container to and above the second container.

2. The water transport system of claim 1, further comprising a connection hose with a first end and a second end, wherein the connection hose is attached to the inlet hole of the second container at said first end and configured to connect to a macerator pump at said second end.

3. The water transport system of claim 2, further comprising a control device communicably coupled to the macerator pump and configured to automatically shut off the macerator pump when the second container is full.

4. The water transport system of claim 3, further comprising a float switch associated with the second container, wherein the control device is configured to automatically shut off the macerator pump when the float switch of the second container indicates that the second container is full.

5. The water transport system of claim 1, wherein at least a portion of the first container interdigitates with at least a portion of the second container in such a way that horizontal movement between the first and secone containers is limited thereby.

6. The water transport system of claim 1, further comprising a pump associated with an outlet hole of the first container and configured to pump a liquid out of the first container.

7. The water transport system of claim 1, further comprising:
   a discharge valve attached to and configured to obstruct the drain pipe in a closed position.

8. The water transport system of claim 1, wherein the connector is at least one L-shaped bracket with a first portion sandwiched between the first and second containers and a second portion configured to be attached to the towing vehicle.

9. A water transport system comprising:
   a first container having at least one of an outlet hole and an inlet hole formed therethrough;
   a second container having an outlet hole and an inlet hole formed therethrough, wherein at least one of the first container and the second container is shaped and configured to fit into the bed of the towing vehicle;
   a macerator pump associated with the inlet hole of the second container and configured to pump a liquid into the second container;
   a control device configured to automatically shut off the macerator pump when the second container is full; and
   further comprising a spacer at least partially located between the first and second containers and fixing the first container to and above the second container, wherein the spacer includes a flat bracket with holes therethrough configured to hold the first and second containers together and an L-shaped bracket attached to the second container configured to be fixed to a bed of a truck.

10. The water transport system of claim 9, further comprising a float switch associated with the second container, wherein the control device is configured to automatically shut off the macerator pump when the float switch of the second container indicates that the second container is full.

11. The water transport system of claim 9, further comprising:
a vent pipe configured for venting the second container, wherein the vent pipe is pivotally attached to the second container.

12. The water transport system of claim 9, further comprising:
a drain pipe extending from the second container; and
a discharge valve attached to and configured to obstruct the drain pipe in a closed position.

13. A water transport system comprising:
a first container having at least one of an outlet hole and an inlet hole formed therethrough, at least a portion of the first container has a length or width that is greater than a width of a bed of a towing vehicle;
a second container having at least one outlet hole and an inlet hole formed therethrough, the second container also having a bottom wall, wherein the second container is configured to be secured to the bed of the towing vehicle;
a vent pipe configured for venting the second container, wherein the vent pipe is pivotally attached to the second container;
a valve associated with the inlet hole of the second container and configured to automatically close when the second container is full;
a hose coupled to the valve and configured to fluidly couple the valve with a macerator pump of an RV, trailer, or motor home;
a control device configured to automatically shut off the macerator pump when the valve is closed, indicating that the second container is full; and
at least one connector detachably connecting the first container to and above the second container.

14. The water transport system of claim 13, further comprising:
a drain pipe extending from one of the outlet holes of the second container; and
a discharge valve attached to and configured to obstruct the drain pipe in a closed position.

15. The water transport system of claim 14, wherein a bottom wall of the second container is substantially sloped in a direction toward the drain pipe.

* * * * *